United States Patent
Bossard

(10) Patent No.: US 9,650,997 B2
(45) Date of Patent: May 16, 2017

(54) ROTARY TURBO ROCKET

(71) Applicant: John Bossard, Huntsville, AL (US)

(72) Inventor: John Bossard, Huntsville, AL (US)

( * ) Notice: Subject to any disclaimer, the term of this patent is extended or adjusted under 35 U.S.C. 154(b) by 731 days.

(21) Appl. No.: 14/191,926

(22) Filed: Feb. 27, 2014

(65) Prior Publication Data

US 2015/0007549 A1  Jan. 8, 2015

Related U.S. Application Data

(60) Provisional application No. 61/772,821, filed on Mar. 5, 2013.

(51) Int. Cl.
*F02K 9/78* (2006.01)
*F02K 9/66* (2006.01)

(52) U.S. Cl.
CPC . *F02K 9/78* (2013.01); *F02K 9/66* (2013.01)

(58) Field of Classification Search
CPC .................................... F02K 9/66; F02K 9/78
See application file for complete search history.

(56) References Cited

U.S. PATENT DOCUMENTS

| | | | |
|---|---|---|---|
| 2,286,908 A | 6/1942 | Goddard | |
| 2,479,829 A | 8/1949 | Goddard | |
| 2,516,462 A * | 7/1950 | Goddard | F02K 9/66 |
| | | | 277/424 |
| 2,673,445 A * | 3/1954 | Bruckmann | F02K 9/52 |
| | | | 60/225 |
| 2,676,457 A * | 4/1954 | Kramer | F02K 9/78 |
| | | | 60/257 |
| 2,883,828 A * | 4/1959 | Howell | F02C 7/224 |
| | | | 60/246 |
| 2,933,886 A * | 4/1960 | Sharma | F02C 7/047 |
| | | | 60/233 |
| 2,937,491 A * | 5/1960 | Howell | F02K 9/74 |
| | | | 415/194 |
| 2,960,824 A * | 11/1960 | Plummer | F02C 7/272 |
| | | | 60/225 |
| 2,968,146 A * | 1/1961 | Howell | F02K 3/04 |
| | | | 415/145 |

(Continued)

FOREIGN PATENT DOCUMENTS

EP     0403372 B1    6/1990

OTHER PUBLICATIONS

Hill and Peterson, Mechanics and Thermodynamics of Propulsion, Second Edition, Addison-Wesley Publishing Company, 1992, pp. 400-406.*

(Continued)

*Primary Examiner* — Lorne Meade
(74) *Attorney, Agent, or Firm* — Tomas Friend

(57) ABSTRACT

A turbojet is combined with a co-axially integrated rotary rocket to form a propulsion system called a Rotary Turbo Rocket that can function as a turbojet, as an afterburning turbojet, as an Air Turbo Rocket, or as a rotary rocket. The Rotary Turbo Rocket can operate in any of these propulsion modes singularly, or in any combination of these propulsion modes, and can transition continuously or abruptly between operating modes. The Rotary Turbo Rocket can span the zero to orbital flight velocity speed range and/or operate continuously as it transitions from atmospheric to space flight by transitioning between operating modes.

13 Claims, 6 Drawing Sheets

(56) References Cited

U.S. PATENT DOCUMENTS

| | | | | |
|---|---|---|---|---|
| 3,036,428 A * | 5/1962 | Chillson | ............ | F02K 9/48 60/258 |
| 3,107,488 A * | 10/1963 | Strauss | ............ | F02K 9/48 60/201 |
| 3,111,005 A * | 11/1963 | Howell et al. | ............ | F02K 9/78 415/192 |
| 3,316,716 A * | 5/1967 | Escher | ............ | F02K 7/18 239/265.17 |
| 3,336,753 A * | 8/1967 | Mullen, II | ............ | F02K 7/18 60/225 |
| 3,414,217 A * | 12/1968 | Kesting | ............ | F02K 9/78 244/3.23 |
| 4,096,803 A * | 6/1978 | Kesting | ............ | F02K 9/78 102/378 |
| 4,342,193 A * | 8/1982 | Thatcher | ............ | F02K 9/78 60/246 |
| 4,817,892 A * | 4/1989 | Janeke | ............ | B64C 1/16 244/15 |
| 4,827,712 A * | 5/1989 | Coplin | ............ | F02K 3/06 415/210.1 |
| 5,012,640 A | 5/1991 | Mirville | | |
| 5,159,809 A | 11/1992 | Cais | | |
| 6,212,876 B1 | 4/2001 | Gregory | | |
| 7,305,816 B2 * | 12/2007 | Freese | ............ | F02K 3/10 60/218 |
| 7,721,524 B2 | 5/2010 | Jahnsen | | |
| 8,281,567 B2 | 10/2012 | Kohn | | |
| 9,169,806 B2 * | 10/2015 | Guyader | ............ | F02C 7/27 |
| 2009/0113873 A1 | 5/2009 | Tweeton | | |

OTHER PUBLICATIONS

Belfiore, Michael, "How a New Engine Could Revolutionize Air and Space Travel", Popular Mechanics, Feb. 2, 2016, pp. 1-4.*

* cited by examiner

ROTARY TURBO ROCKET

BACKGROUND OF THE INVENTION

Field of the Invention

The current invention relates to a class of propulsive engines known as turbine-based-combined-cycle (TBCC) engines and more particularly to a turbojet combined with a rotary rocket.

Description of the Prior Art

The need for endo-atomospheric, trans-atmospheric, and exo-atomospheric vehicles has created interest in propulsion systems that can operate in, through, and out of the atmosphere. A number of propulsion systems designed to operate in atmosphere have been proposed. Turbine-based-combined-cycle (TBCC) engines, for example, are propulsive engines that have elements of both turbojet engines, which use atmospheric air as the main constituent of their reaction mass, and rocket engines, which carry all of their reaction mass.

An Air Turbo Rocket (ATR) is a type of TBCC engine which combines a conventional solid or liquid propellant rocket-type gas generator with a conventional turbojet in such a way that heated, fuel rich gas from the rocket is used to power the mechanical compression of air from the atmosphere. This fuel rich gas and the compressed air are then mixed and burned in a turbojet-type afterburner. The air-breathing portion of the ATR uses atmospheric oxygen to burn the product of fuel rich combustion by the rocket in a combustion chamber that is analogous to an afterburner in a turbojet engine. An advantage of an ATR is relatively high thrust generation at high speeds, high thrust per unit frontal area, and a compact and lightweight engine configuration. A primary disadvantage of an ATR is its high propellant consumption rate, relative to a turbojet. U.S. Pat. No. 4,096,803 discloses a solid propellant air turbo rocket that can operate in a ramjet mode by jettisoning a solid propellant rocket-driven turbo-compressor.

EP 0403372 B1 discloses a combined turbo-rocket ramjet engine capable of operating in a combined turbo-rocket mode or a ramjet mode. The engine uses turbopumps to pump fuel and oxidizer to a gas generator that drives a compressor for turbo-rocket mode operation or to radial injectors for ramjet mode operation. The engine operates in turbo-rocket mode at low Mach speeds and switches to ramjet mode at high Mach speeds. Although the engine uses stored oxygen as an oxidizer, this engine uses atmospheric oxygen in all operational modes and is therefore not capable of operation outside the atmosphere.

U.S. Pat. No. 5,159,809 discloses a propulsion engine designed to reversibly change from air-breathing, non-air-breathing, and combined modes. The engine comprises a rocket engine having an annular combustion chamber disposed inside the central body and downstream from the air-breathing combustion chamber of a jet engine. The rocket engine has a streamlined central body portion extending the central body of the air-breathing combustion chamber to form a spike that penetrates into the throat of the external nozzle. The combustion chamber of the rocket engine and the associated streamlined central body are integrated in the main nozzle and penetrate into the main nozzle at the throat while being shaped to ensure aerodynamic continuity of the air-breathing stream from the air-breathing combustion chamber being ejected through the main nozzle. Although this engine concept combines a jet engine with a rocket engine, allowing both air-breathing and rocket propulsion modes, no advantage is taken of combining the required turbomachinery of the jet and rocket engines, and thus the concept requires separate turbomachinery assemblies for the jet and rocket engines, which greatly increases complexity and mass of the overall engine.

Rotary rocket engines use the rotation of a combustion chamber, powered by the release of exhaust gases from the combustion chamber, to pump and mix propellants. The rotational force comes from a tangential component of rocket thrust, which is created by canting one or more rocket nozzles in the rotary rocket assembly. U.S. Pat. No. 2,479,829 and U.S. Pat. No. 2,395,114 disclose rotating combustion chambers in which rotation is produced by the passage of exhaust gases through curved nozzles and against vanes. U.S. Pat. No. 6,212,876 discloses a rocket motor with an ultracentrifugal liquid pump driven by a tangential component of the primary thrust from multiple combustion chambers by means of tilted nozzles or vanes. Rotation of combustion chambers and pump enhances both propellant mixing and combustion chamber cooling by the Coriolis-effect and centripetal acceleration. Rotary rockets provide the advantage of eliminating the weight and complexity of separate, non-integrated propellant pumps compared to pump-fed combustion chambers, and the weight of high-pressure propellant tanks when compared to pressure-fed combustion chambers. Because the rocket chambers are integral with the pump elements, rotary rockets also eliminate the need for high-pressure, high-speed rotating seals, which is a very challenging and expensive issue for conventional turbopump-fed rocket engines. One disadvantage of a rotary rocket is that there is no rotation at start-up so some means other than rotation must be provided for pumping propellants at engine start. Another disadvantage of rotary rockets is that the rocket chambers are heavier than conventional rocket chambers because they must be designed to withstand the centrifugal forces generated during the rotation of the rocket chambers.

Despite the development of the aforementioned propulsion technologies, high speed endo-atomospheric, trans-atmospheric and exo-atomospheric vehicles powered by TBCC engines have not yet come into widespread use. TBCC engines which are only air-breathing are limited in their maximum flight speeds and altitudes, and cannot fly exo-atomospherically. Alternatively, rocket engines have too high of a propellant-usage rate for long-range endo or trans-atmospheric flights. Thus, there is a continuing need for a new TBCC engine capable of continuously providing propulsion from take-off to landing for endo, trans, and exo-atomospheric flight operations.

SUMMARY OF THE INVENTION

Accordingly, embodiments of the present invention preferably seek to mitigate, alleviate or eliminate one or more deficiencies, disadvantages or issues in the art, such as those identified above, singly or in any combination by providing a Rotary Turbo Rocket (RTR) comprising a turbojet co-axially integrated with a rotary rocket. The turbojet may operate in any mode available to turbojet engines, including subsonic, transonic, and supersonic flight speeds, by adapting the air inlet and turbomachinery operation according to known methods. The rotary rocket may be supplied with fuel and oxidizer at any mixture ratio for use at any time whether in atmosphere or not. When operated with a fuel-rich mixture ratio, the rotary rocket functions as a fuel-injector for an afterburning turbojet mode. Furthermore, when using a fuel-rich mixture ratio, the rotary rocket can produce shaft power to drive the compressor, burning the fuel-rich mixture in the afterburner, and thus allowing the RTR to operate in an Air Turbo Rocket mode. Accordingly, the RTR is able to operate as a turbojet, an afterburning turbojet, an Air Turbo Rocket, a rotary rocket, together or separately, in any combination. Furthermore, the RTR is able to transition between any of these modes abruptly or in a variable or continuous or gradual manner.

According to one aspect of the invention, a rotary turbo rocket is provided, in which a turbojet engine is coaxially integrated with a rotary rocket engine. According to another aspect of the invention, a method is provided for operating a RTR as a turbojet, an afterburning turbojet, an air turbo rocket, and/or as a rotary turbo rocket. According to another aspect of the invention, a method is provided for operating these modes together or separately, and for transitioning continuously or abruptly between these modes. One or more operational parameters of the RTR may be monitored and/or controlled by a computer or processor connected to one or more components of the RTR. Methods for operating the RTR may involve method steps and/or processes that are monitored, controlled, and/or performed by a computer or processor.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF THE INVENTION

Figure 1:
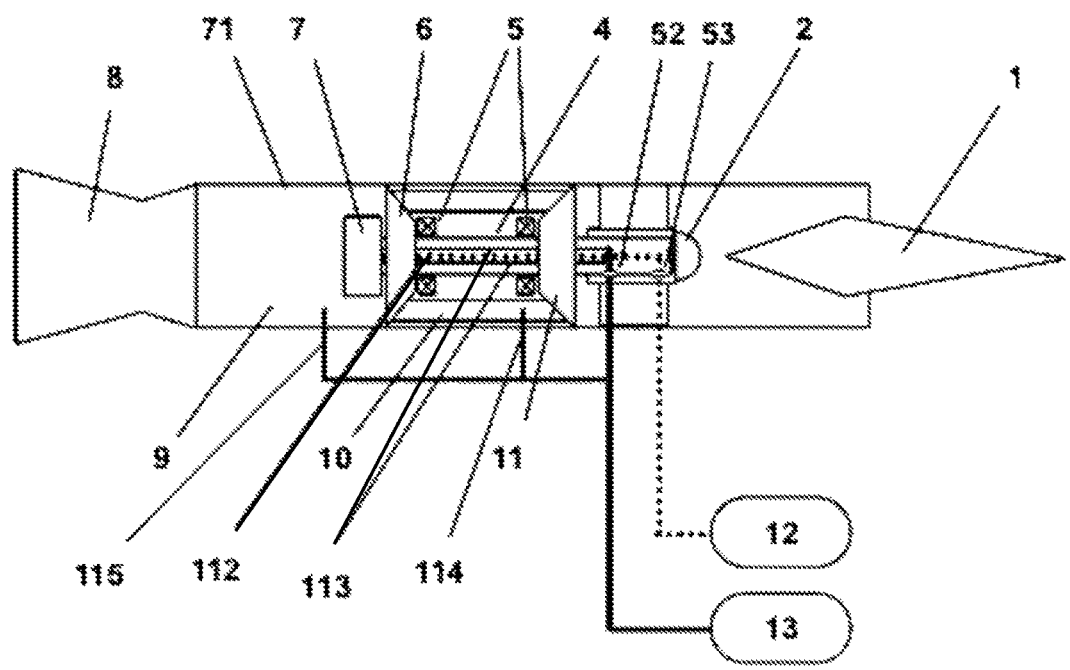
FIG. 1 is a basic schematic illustrating an embodiment of a Rotary Turbo Rocket comprising a rotary rocket assembly co-axially integrated into a turbojet.

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 illustrates the basic configuration of one embodiment of a Rotary Turbo Rocket (RTR) comprising a turbojet and a rotary rocket 7 contained in an outer casing 71. The turbojet comprises a compressor 11, a combustion chamber 10, turbine 6, and bearings 5. The rotary rocket 7 is positioned aft of (behind) the turbojet. The compressor 11, turbine 6, bearings 5, and rotary rocket 7 are mounted on a main shaft 4 through which oxidizer 12 and fuel 13 are delivered through oxidizer and fuel feed lines 112, 113 to the rotary rocket 7. A seal housing 2 contains the front end of the main shaft 4 where inlets into oxidizer and fuel feed lines 112, 113 are located. Bearings 5 allow the main shaft 4 to rotate with respect to the combustion chamber 10 of the turbojet. An optional afterburner 9 may be positioned aft of the rotary rocket 7. An exhaust nozzle 8 is positioned at the aft end of the turbojet and rotary rocket 7. A Turbojet fuel line 114 provides fuel to the turbojet combustor 10.

An air inlet 1 positioned at the front end of the RTR is configured to allow air to enter and provide oxygen to be used by the combustor 10 and the afterburner 9 of the turbojet. During space flight or supersonic flight in rotary rocket mode, the air inlet may be partially or completely closed. For embodiments in which the turbojet may operate at subsonic or supersonic speeds, the air inlet 1 may have a variable geometry that reduces the speed of supersonic incoming air to subsonic speeds. This can be accomplished using known geometries such as conic spikes or wedges that produce shock waves which form on the inlet and slow incoming air to subsonic speeds. The shock waves may be oblique or normal shock waves that form at an oblique angle to or are perpendicular to the flow of air. As flight speeds change, it may be necessary to change the geometry of the inlet. This may be accomplished, for example, by translating an intake spike forward or backward or by changing the wedge angle of an intake wedge in a manner analogous to known supersonic inlets. Likewise, the exit nozzle 8 may also have a variable geometry to accommodate and optimize engine performance over the operating range of the engine. One of the advantages of the RTR over known turbojets is the ability to use the rotary rocket engine to restart the turbojet in the event that the turbojet combustor 10 extinguishes, or flames out.

Figure 5:
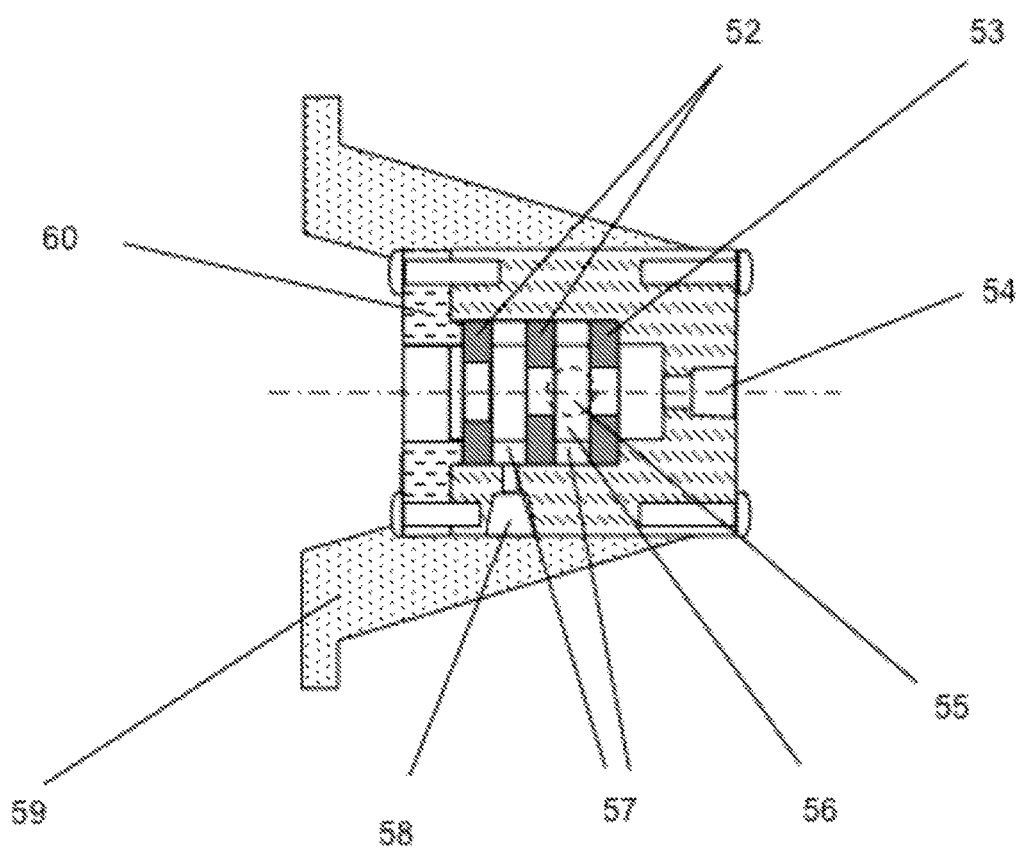
FIG. 5 is a side view illustration of one embodiment of a seal housing assembly.

A seal housing 2 of the RTR in FIG. 1 is a system which allows two or more propellants, typically a fuel and an oxidizer, to pass into the rotating components of the RTR without mixing and without leaking. The seal housing 2 comprises seals 52, 53 that allow the flow of propellants from the fuel and oxidizer sources 12, 13 to channels or passages in the main shaft 4 that deliver propellants to the rotary rocket 7. Any suitable seal technologies may be used including, for example, metallic labyrinth seals and/or Teflon face seals. Metallic labyrinth seals may provide optimal sealing and minimal drag, but are expensive and possibly less tolerant of contamination or shaft dynamic upsets. Teflon face seals may be used and are inexpensive and robust, but provide more drag upon the rotating shafts than metallic labyrinth seals. FIG. 5 shows a more detailed view of one embodiment of a seal housing. A purged space 56 between the fuel inlet 58 and oxidizer inlet 54 may additionally be provided in the seal housing to purge propellants that may leak past the fuel seal 52 and oxidizer seal 53, and thus avoid and/or preclude inadvertent mixing. A purge gas can enter the purged space 56 via the purge gas inlet 55. Seal spacers 57 position the fuel seals 52 and oxidizer seal 53 at their correct axial positions on the main shaft 4, FIG. 1, and relative to the fuel, oxidizer, and purge inlets, 58, 54, and 55. The seal housing is structurally supported and positioned at its correct axial position relative to the outer casing 71 using support brackets 59. These brackets must attach to the seal housing such that they maintain clearance for the fuel, oxidizer, and purge inlets. The seals 52, 53 and the seal spacers 57 are secured within the seal housing using a seal housing cover 60. This cover also provides any pre-load which may be required for proper seal operation. The seal housing 2, FIG. 1, can be placed in any of a number of different positions relative to the rotary rocket and/or the turbojet. The configuration shown in FIG. 1 is for one exemplary embodiment of the RTR in which propellants enter the main shaft of the RTR at the front, just in front of the compressor. The seals need not be positioned as shown but may also be positioned in other locations such as between the compressor 11 and turbine 6, between the turbine 6 and the rotary rocket 7, or aft of the rotary rocket 7. The numbers and locations of seals and purged spaces shown in the figures are exemplary and may be varied.

An advantage of locating the seals and seal housing in front of the compressor is that it positions these components away from the hot areas of the engine. Furthermore, heat transfer to the propellant can be managed effectively because there is more room for insulation, as needed, and because surface areas where heat transfer can occur can be reduced to that of a cylindrical shape. The seals and seal housing may also form an important component pertaining to the rotational dynamics of the RTR's rotating elements. Their placement on one end of the rotating elements provides a means of controlling and mitigating rotation-induced vibrations in the system.

Figure 4:
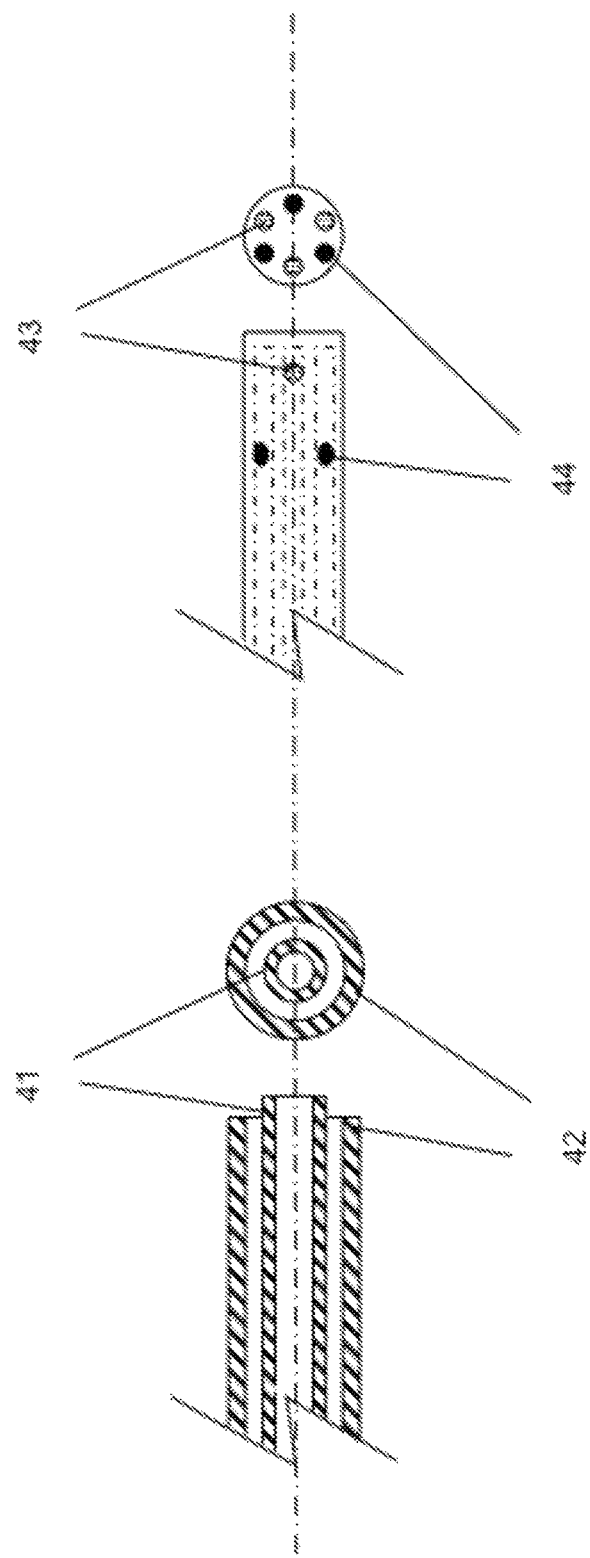
FIGS. 4 is a schematic illustrating one example for the configuration of propellant flow passages within a main shaft assembly of one embodiment of a Rotary Turbo Rocket.

As shown in FIG. 1, the main shaft 4 supports and aligns the main rotating components of the turbojet and the rotary rocket. These components include the compressor 11, turbine 6, bearings 5, rotary rocket 7, rocket combustion chamber(s) 73, rocket nozzles 72, pump 75, forward closure 74 (FIG. 2), and fuel and oxidizer feed lines 113, 112. In addition, the main shaft accommodates the flow of fuel and the oxidizer to the rotary rocket 7. This may be accomplished through any of a number of possible configurations. For example, in FIG. 4, a set of coaxial tubes 41, 42 is used to provide flow passages for the fuel and oxidizer, with the oxidizer passing down a central passage in the main shaft, and fuel passing down an annular passage formed from the outside wall of an inner tube 112, and the inside wall of the main shaft 4. Alternatively, discrete axial channels or passages can be formed in the main shaft, alternating between fuel and oxidizer. These channels can then be accessed with radial holes around the perimeter of the shaft, with the hole sets 43, 44 positioned at different axial positions along the shaft, as shown in FIG. 4. The main shaft 4 also provides the contact and alignment surfaces for the inner races of the RTR's bearings.

The rotating assembly of the RTR comprises the main components of the turbojet (compressor 11, turbine 6, bearings 5), and of the rotary rocket 7, and feed lines 112, 113, and the main shaft 4 as shown in FIG. 1. The bearings 5 of the RTR allow the rotating elements of the RTR to turn freely, while simultaneously supporting radial and axial loads from these elements. Radial loads come from the masses of the rotating elements, from flight-induced loads when the RTR is producing thrust for a flight vehicle, and from rotation-induced vibrations produced by the rotating elements. Axial loads come from the propulsive loads produced by the RTR engine, and from air drag loads which are generated during flight through the atmosphere. The number and locations of the main support bearings are determined by the types and magnitude of loads that they support, and also by the vibrational dynamics of the rotating assembly.

Bearings may be positioned between the compressor 11 and turbine 6, as shown in FIG. 1. Bearings may additionally be positioned within the seal housing 2, as well as aft of the rotary rocket 7, as necessary to resolve vibrational and load issues which may emerge from specific RTR configurations. There must be sufficient space to accommodate the type of bearing required as well as means for lubricating and cooling the bearings. The bearing position may additionally be determined by the need to support or eliminate rotation-induced vibrational modes from the rotating elements of the RTR. Typical bearing types suitable for use in the RTR include ball and roller element bearings and foil-type bearings, as well as other types of bearings. Bearings within the RTR must be of radial and/or axial load bearing capability, depending on bearing location and function.

The turbojet part of the RTR comprises a compressor 11, which may be axial, radial, or mixed-flow in configuration, and may be comprised of one or more compressor stages and their associated stators and diffusers. The turbojet also comprises a combustor 10, which burns fuel 114 injected into the combustor 10 with air from the compressor 11, and a turbine 6. The turbine 6 may be axial, radial, or mixed-flow in configuration and may be comprised of one or more turbine stages, and turbine nozzle guide vanes.

The RTR may possess an afterburner 9, in which fuel and air are burned to produce thrust. Air to the afterburner comes from the compressor 11, and may comprise excess air from the turbojet's combustor 10, or unreacted air from the compressor during operating modes in which the turbojet's combustor is not in operation. Fuel to the afterburner may come from the RTR's rotary rocket 7, in which the rotation of the rotary rocket pumps the fuel into the afterburner. This fuel may be a fuel-rich effluent from a fuel-rich combustion process within the rotary rocket, or unreacted fuel during operating modes in which shaft power to the rotary rocket is being supplied from the turbojet's turbine. Additionally or alternatively, fuel may be injected directly into the afterburner without having passed through the rotary rocket through an afterburner fuel line 115.

Figure 2:
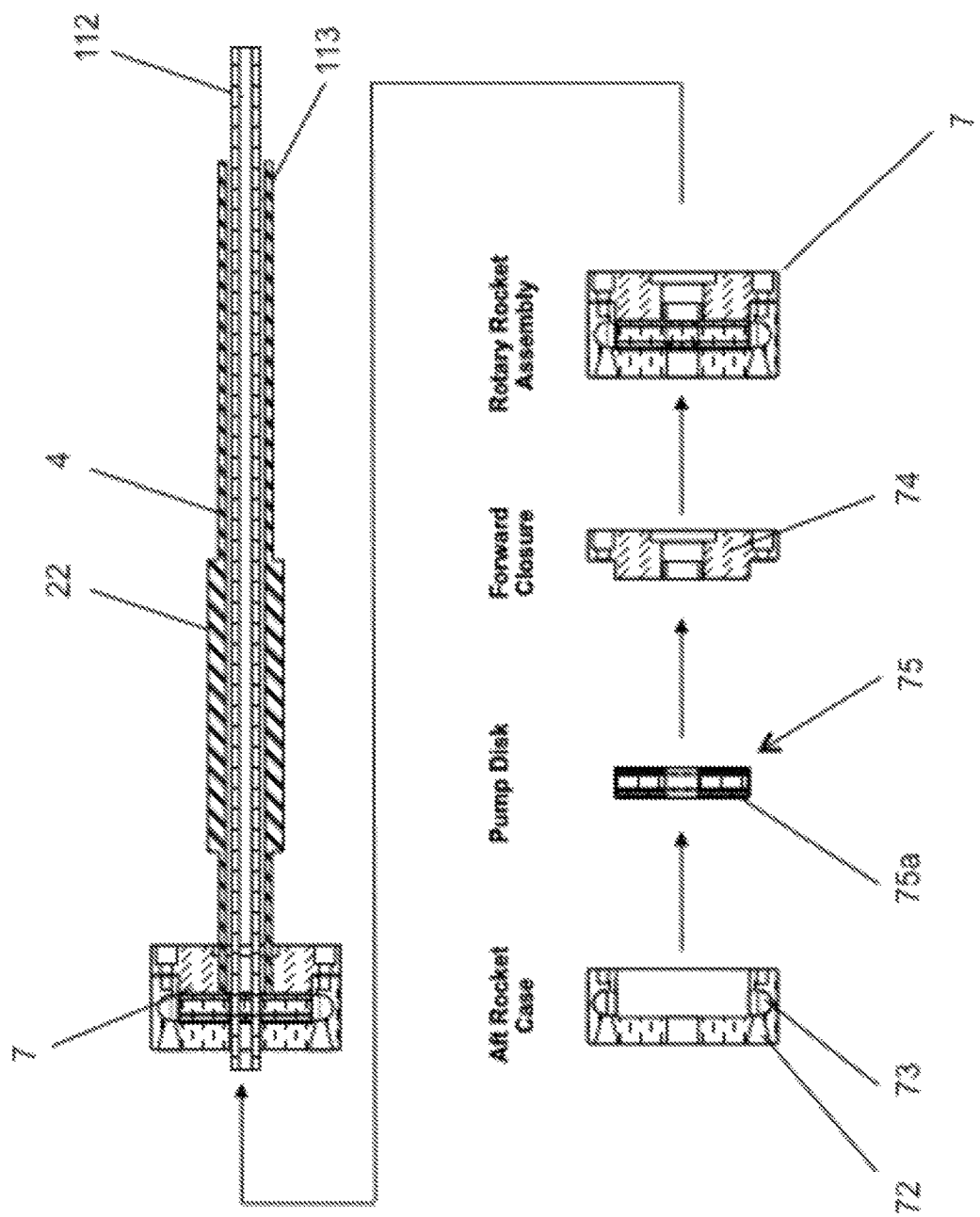
FIG. 2 illustrates one embodiment of a set of axi-symmetric components which fit together and are connected to an aft end of a main shaft to form one embodiment of a rotary rocket assembly.

As shown in FIG. 2, the rotary rocket part of the RTR may comprise a collection of rocket chambers 73, throats, and nozzles 72, typically positioned at a common radius from the main shaft 4. The rocket chambers 73 can be individual chambers, connected chambers, or one continuous annular chamber. The rocket throats and nozzles 72 can also be individual elements, or continuous annular elements. In either configuration, however, the rocket elements must provide a component of thrust in the azimuthal direction, i.e. at a tangent to the rotary rocket's axis of rotation. This thrust component generates shaft power in the rotary rocket, and also to any other operating modes of the RTR which might require shaft power. In some operational modes, the main shaft 4 may be driven by the turbojet to pump propellants 12, 13 into the rotary rocket combustion chamber(s) 73 for starting the rotary rocket. One or more segments 22 of the main shaft 4 may have an expanded diameter that forms one or more stops which may be used to prevent one or more bearings 5 from sliding along the main shaft and/or hold one or more bearings 5 at a fixed position along the main shaft. The one or more segments 22 may have various lengths in the axial direction depending on the needed bearing spacing, and may be disk-shaped, conically-shaped, or cylindrical as shown in FIG. 2.

High rocket chamber pressures are achieved in the rotary rocket because propellants 12, 13 are pumped to high pressures as they flow radially outward from the main shaft 4 to the rocket chambers 73. The pump component 75 of the rotary rocket 7 is located between the main shaft 4 and the rocket chambers 73, and contains passages 75*a* allowing fuel and oxidizer to flow radially outwards. The passages can be, for example, alternating passages located in the same plane, or they can be located on different sides of the propellant pump 75, such as its forward and aft faces as shown in FIG. 2. The shape of each passage, both its cross-sectional area and its path to the rocket chambers, can be configured to provide optimal pumping efficiency, which may depend on the rotating speed and radius of the rotary rocket, and also on the types of propellants being pumped. The propellant pump 75 is capable of pumping any fuel or oxidizer found in regular use in rocket engines, including cryogenic and hypergolic propellants. The rotary rocket may also be configured for use with liquid monopropellants and a catalyst that causes rapid decomposition of the monopropellant and the catalyst can be located in any of a number of locations including the fuel or oxidizer feed lines 112, 113, the propellant pump 75, or the combustion chamber(s) 73.

Figure 3:
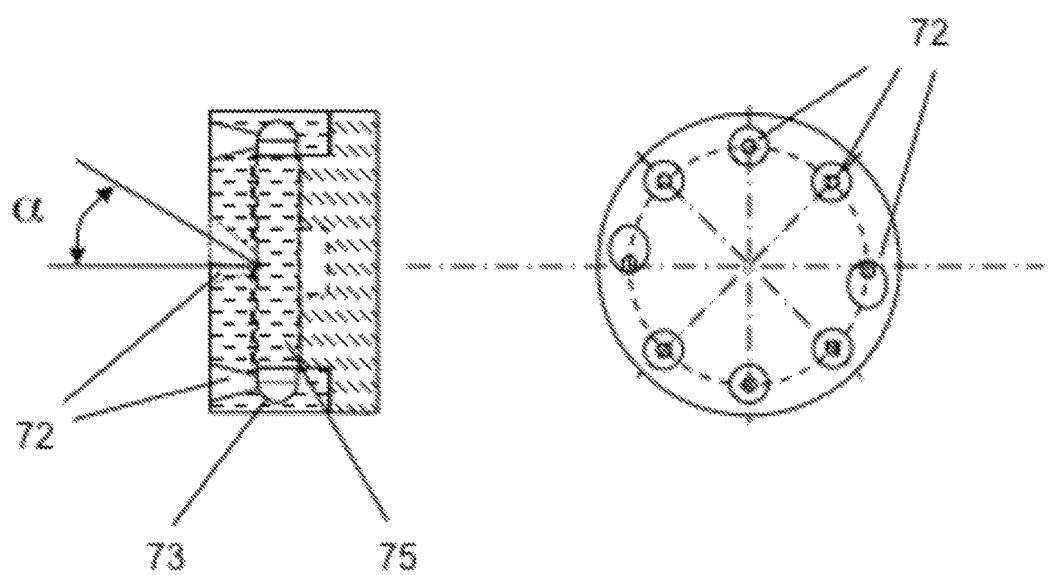
FIG. 3 is a side and end view illustrating a variable cant angle α of an embodiment of a rotary rocket combustion chamber(s) and rocket nozzles.

FIG. 3 shows the combustion chamber configuration of one embodiment on the invention in detail. Propellants exit from the propellant pump 75 at a high velocity and pressure and enter into the combustion chamber or chambers 73 of the rotary rocket 7. There, the propellants vaporize, mix, and combust to form a hot, high pressure gas which exits through the nozzle or nozzles 72 of the rotary rocket, and thereby produces thrust. Because the propellants enter the combustion chamber at high velocity, the walls of the chamber 73 are preferably curved, allowing the flow direction of the propellants to be directed into each other to promote atomization and mixing, and also preventing or eliminating chamber erosion caused by the high-velocity impact of propellants into the chamber walls. The combustion chamber 73 of the rotary rocket 7 may comprise individual chambers, interconnected chambers, or a single continuous annular chamber. By using a single annular chamber, propellant flow rate variations among the propellant pump passages will not result in thrust variations among the rocket chambers 73. The throats, or smallest cross-sectional flow areas, of the rotary rocket typically lie at a constant radial distance from the axis of rotation. They are sized based on the total propellant flow rate entering the combustion chamber(s) 73, and the number of rocket nozzles 72 used in the rotary rocket design. The rocket nozzles 72 extend from the throats to the aft face of the rotary rocket. Each of the nozzles is of standard rocket nozzle design and can, for example be in the form of a regular cone with a 15° half-angle, or a contoured, bell-type nozzle.

To produce the torque required to operate in various modes of the RTR, some or all of the rocket nozzles 72 may be canted, or set at an angle α relative to the axis of rotation (FIG. 3). The magnitude of the total torque produced by the rotary rocket equals the magnitude of the thrust component in the tangential direction multiplied by the radius to the centerline of the throat, and multiplied by the number of rocket nozzles possessing a cant angle. The power produced by the canted rockets equals to total torque multiplied by the angular speed of the RTR's rotating components. This torque power is the output power of the rotary rocket, and provides the required power to pump the propellants, as well as overcome any bearing and seal losses. This torque power can also be used to provide power to the compressor 11 when operating in Air Turbo Rocket mode, or to supplement power produced by the turbine 6 when operating in turbojet mode. During operation of the rotary rocket, the rotating components spin up and reach an rpm, or rotary speed, in which the torque power output equals the sum of the pump and bearing/seal losses, which is a power input. This power balance is also achieved when the RTR is operating in other propulsion modes, such as the Air Turbo Rocket, and turbojet modes.

Variations in rotary rocket torque power output can be achieved by varying the propellant flow rate and/or changing the cant angle α of the rocket nozzles 72, as shown in FIG. 3. Variations in the cant angle can be achieved by using a mechanical, electromechanical, magnetic, electromagnetic, hydraulic, or other linkage to translate or gimbal the rocket nozzle or nozzles, through a rotating connection.

When the RTR operates in the turbojet mode, its steady state operation is essentially the same as that of a turbojet without an integrated rotary rocket. Fuel 114 is supplied to the combustor 10 of the turbojet where it mixes and burns with air from the compressor 11. The combustion products flow through the turbojet's turbine 6, producing shaft power to drive the compressor. When these combustion products are exhausted through the RTR exit nozzle 8, jet thrust is produced. The transient operation of the turbojet differs from that of the RTR. The increased mass of the RTR means that its rotational inertia is larger than that of the turbojet, which increases the time needed to bring the RTR up to, or down to, a given rpm relative to a conventional turbojet engine. The increased angular inertia of the RTR is actually a benefit to overall turbojet operation because it dampens thermodynamic and aerodynamic perturbations during turbojet and air turbo rocket operation.

For the RTR to operate in afterburning turbojet mode, fuel is supplied to the rotary rocket 7, but with little or no oxidizer. The fuel 13 is pumped into the afterburner region 9 of the RTR through the rotary rocket 7, with pump power being supplied predominately or completely from the turbojet's turbine 6. Fuel pumped into the afterburner 9 is then ignited and burned as per normal afterburner operation. The turbojet operates as per normal, with any unreacted air from the turbojet mixing and burning with the fuel emerging from the rotary rocket. Alternatively or additionally, fuel can be provided to the afterburner 9 using direct injection of fuel through one or more afterburner fuel lines 115.

For the RTR to operate in Air Turbo Rocket mode, fuel 13 and some oxidizer 12 are supplied to the rotary rocket 7, where the fuel-rich mixture is burned. As this mixture exhausts from the rotary rocket 7, it supplies torque power to pump the propellants, and also provides power to drive the compressor 11. The fuel-rich rotary rocket exhaust mixes and burns with air from the compressor in the afterburner 9, thus producing thrust. Fuel through fuel lines 114 to the turbojet combustor 10 can be turned off in this mode, since all requisite power to drive the compressor can come from the rotary rocket 7. There may also be operating modes unique to the RTR in which fuel and/or oxidizer may be supplied simultaneously to some combination to the turbojet combustor 10, to the afterburner 9, and to the rotary rocket 7, thus allowing engine performance and operational modes which have not heretofore been possible.

When the RTR is in rocket mode, fuel 13 and oxidizer 12 enter the rocket chambers 73 at a near-stoichiometric mixture ratio, where they mix and burn. Combustion products exit through the rocket nozzles 72 producing rocket thrust. Pump power is supplied completely from the power produced from the torque of the rotary rocket's canted rocket nozzles. No fuel is supplied to the turbojet combustor 10 or afterburner 9, and the turbojet's compressor 11 and turbine 6 may or may not be mechanically coupled to the main shaft 4.

Because the shaft power produced by the rotary rocket may depend only on the propellant flow rate and rocket nozzle cant angle, the RTR can transition continuously or abruptly between operating modes. This also allows multiple modes to operate together or individually. Generally, the RTR is operated in an air breathing mode for as long as possible to take advantage of atmospheric air as a significant portion of the reaction mass as well as a source of oxidizer. This minimizes propellant usage, resulting in longer flight ranges and/or, for suborbital or orbital flight, a higher maximum velocity. A transition from subsonic to supersonic flight may be achieved in any operating mode. As flight velocity increases at supersonic speeds, air becomes shock-heated and more difficult to use. For this reason, the RTR can transition to pure rocket mode at a flight speed that optimizes propellant consumption. The rotary rocket, however, may be engaged at any time and at any flight speed, independently of the air-breathing mode in operation. For instance, engaging the rotary rocket can provide significant thrust augmentation in air-breathing modes at subsonic or supersonic speeds.

One important feature of RTR operation is the power balance during the various operating modes. The power balance refers to the fact that the power input needed to operate some of the components of the engine must come from the power output generated by other components. To reach a steady state of dynamic equilibrium, the total power input required must be equal to the power output. Components which require power input include the turbojet compressor 11, the rotary rocket pump 75, and losses from bearings 5 and seals 52, 53. Components which produce a power output include the turbojet turbine 6, and the torque power produced by the rotary rocket 7. The power balance varies depending on the operating mode of the RTR. In turbojet and turbojet/afterburner modes, the power balance is achieved when the power output of the turbine 6 equals the sum of the power input to the compressor 11 plus bearing and seal losses. In Air Turbo rocket mode, power balance is achieved when the power output from the rotary rocket 7 equals the sum of the power input to the compressor 11 plus the pump power to operate the rotary rocket 7, plus bearing and seal losses. In rocket mode, power balance is achieved when the power output from the rotary rocket 7 equals the sum of the pump power required by the rotary rocket's pump 75, plus bearing and seal losses. And there may be unique RTR operating modes in which the power balance is achieved through some combination of power output from the turbine 6 and the rotary rocket 7 which then equals the power input to the compressor 11, the pump power required by the rotary rocket pump 75, and the bearings and seal losses.

Figure 6:
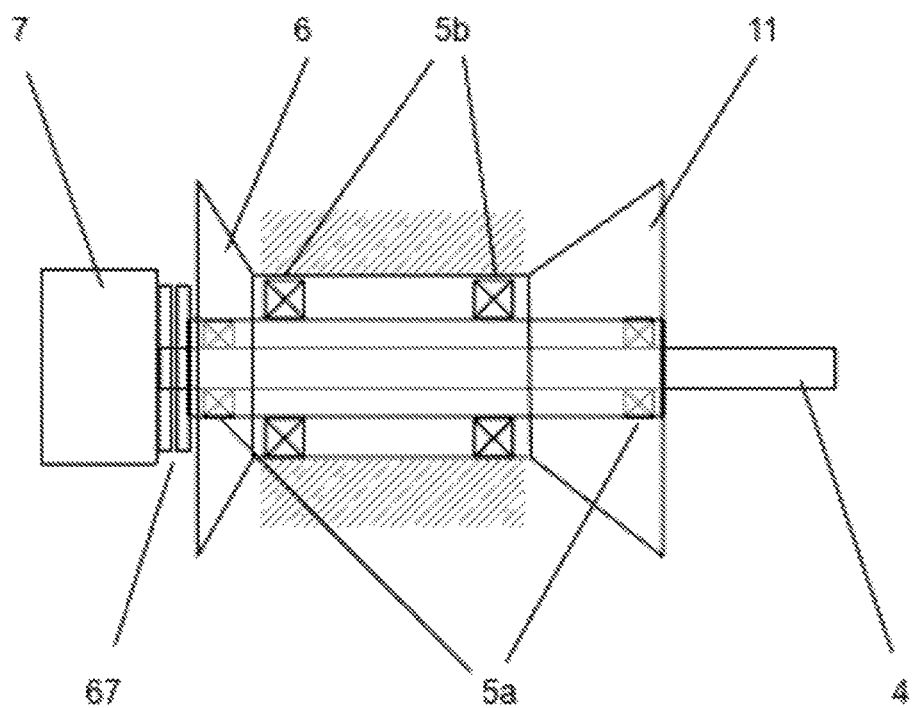
FIG. 6 is a schematic illustrating an embodiment of a Rotary Turbo Rocket in which the turbojet and the rotary rocket can be mechanically coupled or de-coupled.

Because of the co-axial configuration of the RTR, it is possible to mechanically couple and uncouple the rotating elements of the turbojet with those of the rotary rocket for purposes of operational efficiency and optimization. For example, during rotary rocket operation, the rotating elements of the turbojet are not required, and it may be desirable to mechanically decouple the rotary rocket 7 from the turbojet so that the turbojet's rotating components are not rotating. A similar condition may exist when the turbojet is operating and the rotary rocket is not. However, there may be operating modes in which it is desirable or required to have the rotary rocket 7 and turbojet mechanically coupled, such as during afterburner operation, or when operating in Air Turbo Rocket mode, or in other possible operating modes of the RTR. In order to be able to mechanically couple or de-couple the rotating components of the rotary rocket from those of the turbojet, the rotary rocket must be able to rotate independently of the turbojet. One possible configuration is shown in FIG. 6, wherein the main shaft 4 of the rotary rocket 7 possesses its own first set of bearings 5a, and the turbojet assembly possesses its own second set of bearings 5b. These two assemblies can be mechanical coupled or de-coupled using a coupling device 67. This configuration allows the rotary rocket and the turbojet assembly to rotate separately or together, depending upon the commanded state of the coupling device 67. The coupling device may comprise, for example, a clutch-type device another mechanism configured to alternately engage and disengage rotatable elements of the turbojet with and from the rotatable elements of the rotary rocket.

While several embodiments of the present invention have been described and illustrated herein, those of ordinary skill in the art will readily envision a variety of other means and/or structures for performing the functions and/or obtaining the results and/or one or more of the advantages described herein. Each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of", or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

The invention claimed is:

1. A rotary turbo rocket comprising:
a forward facing air inlet;
an aft facing exhaust nozzle;
a turbojet engine having a longitudinal axis and comprising a compressor, a turbojet combustion chamber, and a turbine;
a rotary rocket engine having a longitudinal axis and comprising a rotary rocket combustion chamber and two or more rocket outlets configured to release rocket combustion products toward the aft facing exhaust nozzle;
a main shaft supporting rotating components of the turbojet and the rotary rocket engine; and
a seal assembly configured to provide a first flow path between a fuel storage tank and a fuel feed line and said seal assembly configured to provide a second flow path between an oxidizer storage tank and an oxidizer feed line, said seal assembly positioned around a forward end of said main shaft in front of said compressor and behind said air inlet,
wherein the turbojet engine and the rotary rocket engine are arranged coaxially with the turbojet engine positioned behind the air inlet and in front of the rotary rocket engine and the exhaust nozzle positioned behind the rotary rocket engine at the aft end of the rotary turbo rocket;
wherein the rotary rocket engine is located at an aft end of the main shaft and the main shaft comprises said fuel feed line and said oxidizer feed line through which fuel and oxidizer are fed into the rotary rocket combustion chamber; and
wherein said two or more rocket outlets each comprise a rocket nozzle positioned at a common radius from the main shaft and configured to provide a torque on a longitudinal axis of rotation of said rotary rocket such that the rotary rocket, in use, rotates said man shaft.

2. The rotary turbo rocket of claim 1, wherein the rotary rocket, main shaft and compressor are configured such that, when the rotary rocket is firing, the compressor is driven by power delivered from the rotary rocket through the main shaft to the compressor.

3. The rotary turbo rocket of claim 1, wherein the rotary rocket, the main shaft, and the turbojet engine are configured such that, when the turbojet engine is operating, a rotation of the rotary rocket is driven by power delivered to the rotary rocket through the main shaft from the turbojet engine.

4. The rotary turbo rocket of claim 1, and further comprising an afterburner positioned between said rocket outlets and said aft facing exhaust nozzle.

5. The rotary turbo rocket of claim 1, wherein one or more of said oxidizer feed line and said fuel feed line comprises a central fluid passage and an annular fluid passage.

6. The rotary turbo rocket of claim 1, wherein one of said fuel feed line and said oxidizer feed line comprises an axial channel in fluid communication with a radial hole around a perimeter of the main shaft.

7. The rotary turbo rocket of claim 1, wherein said seal assembly comprises a seal housing, a fuel inlet, a fuel seal, an oxidizer inlet, an oxidizer seal, a purge gas inlet, a purged space between the fuel inlet and the oxidizer inlet, and seal spacers positioning the fuel seal and the oxidizer seal on the main shaft relative to the fuel inlet, oxidizer inlet, and the purge space such that fuel and/or oxidizer that leaks past the fuel seal and/or the oxidizer seal is purged from said purged space when a purge gas is delivered through said purge gas inlet to prevent inadvertent mixing a fuel and an oxidizer.

8. The rotary turbo rocket of claim 7, wherein the seals and seal housing are located in front of the compressor.

9. The rotary turbo rocket of claim 1, wherein said rotary rocket engine comprises a housing containing said rotary rocket combustion chamber and said housing comprises one or more passages configured to deliver one or more propellants from the main shaft radially to said rotary rocket combustion chamber and wherein rotation of the rotary rocket engine provides a pumping force sufficient to pump said propellant into said rotary rocket combustion chamber.

10. The rotary turbo rocket of claim 9, wherein said housing comprises separate passages configured to deliver fuel and oxidizer radially outwards from fuel and oxidizer passages in the main shaft to one or more of said rotary rocket combustion chambers contained in the housing.

11. The rotary turbo rocket of claim 4, wherein shaft power produced by the turbojet is transferred to the rotary rocket, and thereby pumps fuel into the afterburner of the rotary turbo rocket.

12. The rotary turbo rocket of claim 1, wherein the compressor is a radial compressor.

13. A method for operating the rotary turbo rocket of claim 1, said method comprising:
operating the rotary turbo rocket in a turbojet mode in which fuel and air are provided to the turbojet combustion chamber and no fuel or oxidizer are provided to the rotary rocket combustion chamber;
operating the rotary turbo rocket in an air turbo rocket mode in which air is provided to the afterburner and fuel and oxidizer are provided through the rotary rocket to the afterburner; and
operating the rotary turbo rocket in a rotary rocket mode in which fuel and oxidizer are provided to the rotary rocket combustion chamber and no fuel or air are provided to the turbojet combustion chamber, wherein torque required for pumping fuel and oxidizer to the rotary rocket combustion chamber is provided solely by the rotary rocket during air turbo rocket and rotary rocket modes.

* * * * *